Figure 1:
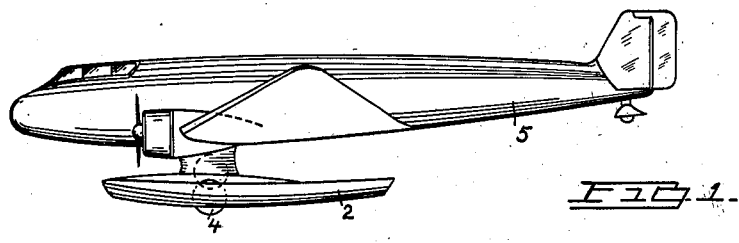

Jan. 14, 1941.  B. VON SCHLIPPE  2,228,860
ARRANGEMENT FOR LAND AIRPLANES FOR PREVENTING SINKING IN
EMERGENCY ALIGHTING ON THE WATER
Filed March 31, 1939

Inventor
Boris Von Schlippe
by Gerald F. Baldwin
his Attorney.

Patented Jan. 14, 1941

2,228,860

UNITED STATES PATENT OFFICE 2,228,860

ARRANGEMENT FOR LAND AIRPLANES FOR PREVENTING SINKING IN EMERGENCY ALIGHTING ON THE WATER

Boris von Schlippe, Dessau, Germany, assignor to Junkers Flugzeug-und-Motorenwerke, Aktiengesellschaft, a corporation of Germany Application March 31, 1939, Serial No. 265,240
In Germany April 4, 1938

2 Claims. (Cl. 244—105)

The invention relates to arrangements for land airplanes for preventing sinking in emergency alighting on water. Boat seaplanes or float seaplanes, that is to say, pronounced hydro-airplanes, are of course prevented from sinking in consequence of their construction. Owing to their special lay-out such hydro-airplanes can transport only a part of the useful load which can be carried by a land airplane for the reason that the devices serving for floating, taking off from the water and alighting on the water are comparatively heavy. These devices (floating bodies) have the further disadvantage of an unfavorable aerodynamic form, in consequence of an equipment of steps, bilge edges and keel edges, for taking up the impact of the water and for breaking the waves at the floating bodies, being required. For this reason hydro-airplanes are at a disadvantage with respect to land airplanes in carrying out long distance flights (transoceanic flights) as the floating devices, which in hydro-airplanes require 1.8–2 times the aiplane weight for water displacement to answer their purpose, are not present in land airplanes, so their useful load weight can be considerably higher. But since especially in transoceanic flights emergency alighting on the water has to be counted on by all means and since land airplanes when alighting on the water, owing to the absence of suitable expedients, will sink or noseover, they will in general not be used for transoceanic flights although they are much better suited for the purpose for the reasons referred to.

The invention has for its object to render land airplanes suitable for carrying out long-distance flights, for instance, transoceanic flights, and equip them with devices which prevent their sinking in emergency alighting on the water without depriving them of the character of a pronounced land airplane. This object is attained by arranging at the land airplane float-like hollow bodies designed in such a manner that they keep the airplane floating, namely, above the surface of the water, and prevent its sinking, without, however, making a water start possible. These hollow bodies serving as floats have a water displacement of about 0.4–1.2 times the weight of the airplane. In suitable construction they show an elongated float-like form with a continuous run of limiting surfaces offering very slight resistance to air. They have sufficient rigidity for taking up the water impact when descending on the water. In order to facilitate alighting on the water the floating bodies to be arranged according to the invention may also be provided with the steps known from the floats of hydro-airplanes. In this case, however, the steps are provided with a special wind-cutting fairing made of a material which will be destroyed by the impact resulting from alighting on the water. The floating bodies can also be advantageously used as fairing for the chassis of the land airplane. There is further a possibility of adapting the floating bodies for accommodating loads.

The drawing shows the subject of the invention in several modes of construction.

Illustration 1 is a lateral view of an airplane with floating equipment.

Illustration 2 is a front view of the same airplane, after alighting on the water, in the state of suspension caused by the floating equipment.

Illustrations 3 and 4 are corresponding representations of an airplane with a further mode of construction of the floating equipment.

Illustration 5 is a diagram of a floating body removed from the body of the airplane.

Figure 2:
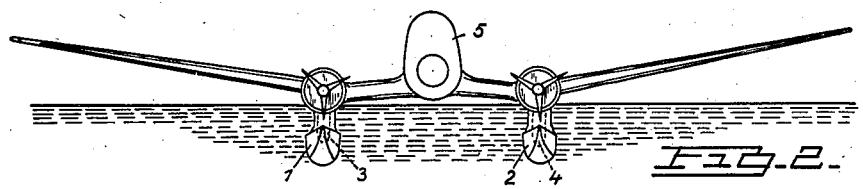
Figure 3:
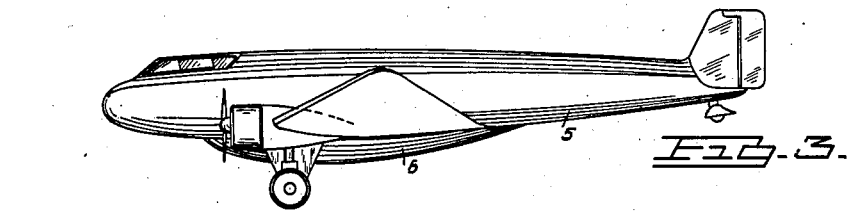
Figure 4:
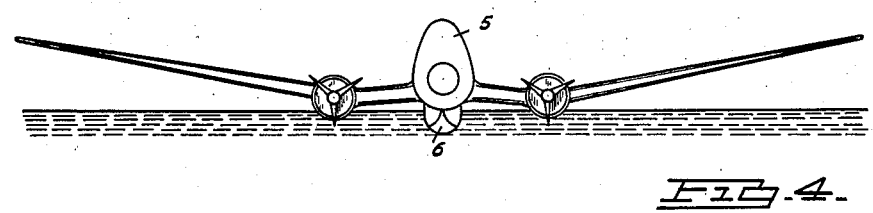
Figure 5:
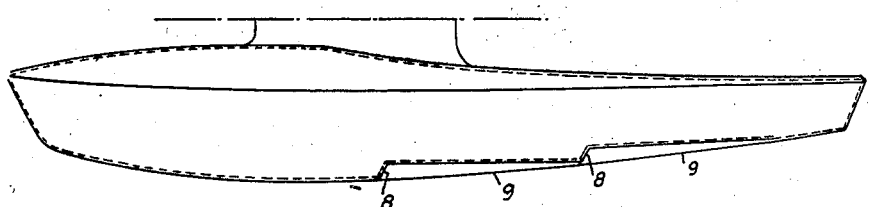

In the mode of construction of the arrangement according to Figures 1 and 2 the floating bodies 1, 2 are designed as fairings for the undercarriage 3, 4 of the airplane 5. They form the closed hollow body with passages for the rigid or retractable undercarriage.

Illustrations 3 and 4 show a hollow body 6, serving as floating body, arranged at the body of the airplane 5. The hollow body is accessible from the interior of the airplane and can be utilized for accommodating loads. It is of an elongated form with a continuous run of limiting surfaces (streamline body).

Illustration 5 shows an individual hollow body, serving as floating body, in the state as taken off the airplane body. This floating body is provided, for improving its qualities when coming in contact with the water, with the step 8 known from the floats of hydro-airplanes, covered by a fairing 9 producing the continuous run of the limiting surface. This fairing 9 is made of a material which will be destroyed when the floating body alights on the water, so that the step operates immediately on coming in contact with the water.

What is claimed is:

1. A float pontoon for airplanes comprising a displacement body, steps on the under surface thereof, and material capable of dissipation on striking water faired into said steps to provide a streamlined under surface.

2. A float pontoon for airplanes comprising a displacement body, steps on the under surface thereof, and frangible material faired into said steps to provide a streamlined under surface, said frangible material being adapted to be dissipated when the pontoon strikes the water to permit normal functioning of the stepped under surface.

BORIS VON SCHLIPPE.